April 21, 1931. R. C. HOPKINS 1,801,959
PIN CONTROL REGULATING VALVE
Filed Dec. 3, 1929

Inventor
R. C. Hopkins
By Harry Frease
Attorney

Patented Apr. 21, 1931

1,801,959

UNITED STATES PATENT OFFICE

ROBERT C. HOPKINS, OF ALLIANCE, OHIO

PIN-CONTROL REGULATING VALVE

Application filed December 3, 1929. Serial No. 411,296.

The invention relates to valves and more particularly to a valve adapted to regulate a small quantity flow of oil or other liquids, and regulate pressure up to as high as two or three thousand pounds per square inch.

The object of the improvement is to provide a valve including a pin loosely suspended therein and free to oscillate or swing as a pendulum within a conical chamber forming the valve seat, the pin being so arranged that it may oscillate or vibrate within the chamber at any rate, speed or motion without changing the ratio of its own area to the chamber.

A further object is to provide a valve so constructed that the mechanism thereof is automatically shifted or vibrated by the jars and vibration caused by adjacent machinery, tending to automatically accomplish the freeing of any particles of sludge or heavy material which might lodge in the valve and otherwise clog the same.

The above and other objects may be attained by providing a nut upon the end of the valve stem and machined to fit a seat within the valve casing, the nut having a chamber in its lower portion terminating in a concentric bore adapted to loosely receive the head of an ordinary wire nail or the like, the nail depending through the bore and being free to oscillate or swing as a pedulum within a conical chamber below the valve seat and communicating with the oil inlet.

Figure 2:
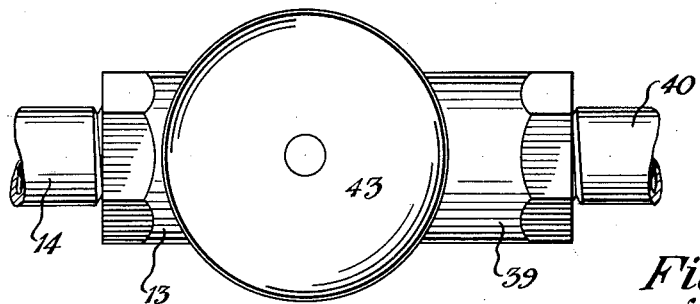
Figure 1:
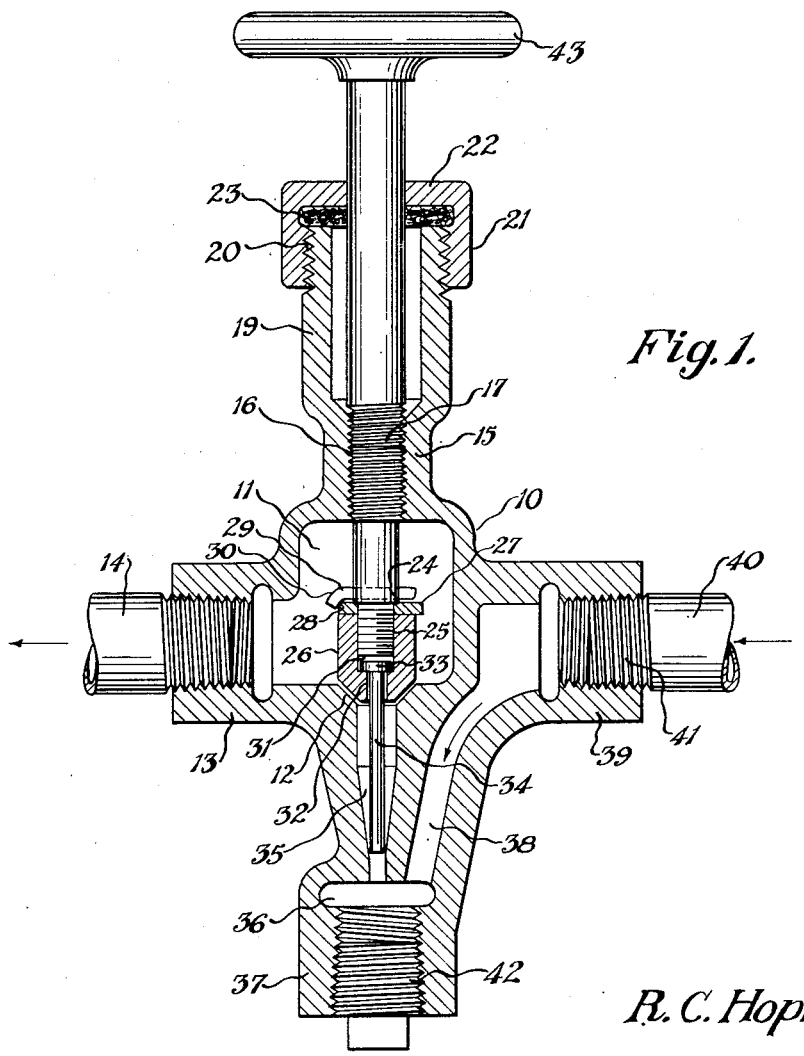

An embodiment of the invention is illustrated in the accompanying drawing, in which Figure 1 is a vertical sectional view through the improved valve; and Fig. 2, a top plan view of the same.

Similar numerals refer to similar parts throughout the drawing.

The valve includes a casing indicated generally at 10, having the central chamber 11 provided at its lower side with the conical valve seat 12 and at one side with an internally threaded neck 13 for the reception of the outlet pipe 14.

An upright neck 15 extends upward from the central chamber and is provided, directly above the same, with the internally threaded bore 16 for the reception of the screw threaded intermediate portion 17 of the valve stem shown generally at 18.

Above this screw threaded bore, the neck 15 may be slightly enlarged as at 19, the upper end thereof being externally threaded as shown at 20, to receive the depending internally threaded peripheral flange 21 of the cap 22, through which the valve stem extends, suitable packing, as shown at 23, being located around the stem, between the cap and the upper end of the neck.

The lower end of the valve stem 18, within the chamber 11, is shouldered as at 24 and terminates in the threaded extremity 25 and the nut 26 is threaded thereon, a lock washer 27 being interposed between the upper end of the nut and the shoulder 24.

For the purpose of preventing any tendency of the nut to come loose from the valve stem, the lock washer may have a notch 28 formed in one edge and a cotter pin or the like, as indicated at 29, may be located through the stem, just above the washer, and one end thereof bent down into the notch as indicated at 30.

A chamber 31 is formed in the nut, below the lower end of the valve stem, and terminates in a bore 32 extending through the lower end of the nut. This chamber provides for the reception and retention of the head 33 of an ordinary wire nail or the like indicated at 34 which depends into the elongated conical chamber 35 formed in the valve casing below the central chamber 11 and communicating therewith through the valve seat 12.

The lower, restricted end of the conical chamber 35 communicates with the enlarged chamber 36 formed in the depending internally threaded neck 37, and a passage 38 forms a communication between said chamber 36 and the internally threaded neck 39 which may be located in alinement with the neck 13.

An inlet pipe 40 provided with a threaded end portion 41 may be connected to the neck 39 if it is desired to use the valve straight in the line as a globe valve, in which case a threaded plug 42 may be inserted into the neck 37 to close the same.

If it is desired to use the valve as an angle valve, the plug 42 may be inserted into the neck 39 and the oil inlet pipe inserted into the neck 37. For the purpose of regulating the valve stem, a hand wheel 43 or the like may be fixed upon the upper end of the same.

The pin 34 being universally pivoted is free to move about and to swing as a pendulum or oscillate in any direction governed by its position in the conical chamber 35. Being thus loosely held, the vibration of adjacent machinery will assist in dislodging particles of sludge and the like in the oil or other liquid which would otherwise clog and stop the valve.

If a particle of sludge or other heavy material should find lodgement, or pass along the side of the pin, a pressure woud be set up that would dislocate and cause the pin to move out of that position, and in this way permit the particle to pass through.

The pin can oscillate or vibrate within the valve at any rate, speed or motion without changing the ratio of its own area to that of the conical chamber but simply changing the position of the pin from various eccentric positions and again to concentric position, the ratio remaining the same, thus producing a reliable regulator.

It will be seen that with the construction of valve pin illustrated and described, the pressure of oil upon the lower end of the pin will raise the same so as to provide sufficient area for the oil to pass through the chamber 35, around the pin. If the pin happens to fall in the center of the chamber 35, that is, to be concentric therewith, the valve opening will be a concentric ring.

If the valve stem is raised by the hand wheel 43, the pin 34 will be raised also, and the inclined walls of the conical chamber 35 will permit a slightly greater oscillation or vibration of the pin as it is raised with the valve stem.

If the jar of hammers or other machinery shifts the position of the pin, the valve opening will be eccentric and may even at times be crescent-shaped when the pin touches one side or another of the chamber 35.

Due to the vibration in the ordinary shop, and from the flow of oil, especially that carrying heavy particles of sludge and the like, there will be a tendency to move the pin either with a pendulum motion or in an elliptical or circular path, but it is evident that if a particle of sludge or the like should be forced through the valve and lodge on the end of the stem, the pressure itself would shift the rod sufficiently to pass the particle through the valve.

Thus a regulating valve is produced wherein the tendency to stop and plug up is eliminated through the valve itself by vibration and equal pressures or any other force which would disturb the relative position of the valve pin within the conical valve chamber.

I claim:

1. A valve including a casing having a conical chamber therein communicating with an inlet and an outlet, a pin loosely suspended in the chamber between the inlet and outlet, and means for longitudinally adjusting the relative position of the pin within the chamber.

2. A valve including a casing having a conical chamber therein communicating with an inlet and an outlet, a pin loosely pivoted in the chamber between the inlet and outlet, and means for longitudinally adjusting the relative position of the pin within the chamber.

3. A valve including a casing having a conical chamber therein communicating with an inlet and an outlet, a pin universally pivoted in the chamber between the inlet and outlet, and means for longitudinally adjusting the relative position of the pin within the chamber.

4. A valve including a casing having a conical chamber therein communicating with an inlet and an outlet, a pin loosely suspended in the chamber between the inlet and outlet and adapted to freely move longitudinally within narrow limits, and means for longitudinally adjusting the relative position of the pin within the chamber.

5. A valve including a casing having a conical chamber therein communicating with an inlet and an outlet, a pin loosely pivoted in the chamber between the inlet and outlet and adapted to freely move longitudinally within narrow limits, and means for longitudinally adjusting the relative position of the pin within the chamber.

6. A valve including a casing having a conical chamber therein communicating with an inlet and an outlet, a pin universally pivoted in the chamber between the inlet and outlet and adapted to freely move longitudinally within narrow limits, and means for longitudinally adjusting the relative position of the pin within the chamber.

7. A valve including a casing having a chamber therein communicating with an inlet and an outlet, a valve seat in the chamber, a valve member in the chamber adapted to cooperate with said valve seat, and a pin loosely suspended from the valve member.

8. A valve including a casing having a chamber therein communicating with an inlet and an outlet, and having a conical portion, a valve seat in the chamber, a valve member in the chamber adapted to cooperate with said valve seat, and a pin loosely suspended from the valve member and extending into the conical portion of the chamber.

9. A valve including a casing having a chamber therein communicating with an inlet and an outlet, a valve seat in the chamber, a valve member in the chamber adapted to cooperate with said valve seat, a pin loosely suspended from the valve member, and means for adjusting the valve member with reference to the valve seat.

10. A valve including a casing having a chamber therein communicating with an inlet and an outlet and having a conical portion, a valve seat in the chamber, a valve member in the chamber adapted to cooperate with said valve seat, a pin loosely suspended from the valve member and extending into the conical portion of the chamber, and means for adjusting the valve member with reference to the valve seat.

In testimony that I claim the above, I have hereunto subscribed my name.

ROBERT C. HOPKINS.